Dec. 7, 1926.

E. M. MAYER

VEHICLE FOR SMALL CHILDREN

Filed April 8, 1925

1,609,733

INVENTOR.
Emil M. Mayer
by John W. Frehli
ATTORNEY.

Patented Dec. 7, 1926.

1,609,733

UNITED STATES PATENT OFFICE.

EMIL M. MAYER, OF CINCINNATI, OHIO, ASSIGNOR TO THE WONDER MANUFACTURING COMPANY, A CORPORATION OF OHIO.

VEHICLE FOR SMALL CHILDREN.

Application filed April 8, 1925. Serial No. 21,684.

My invention relates to that class of vehicles for small children, known as baby walkers, kiddie cars, and other small vehicles, which have a steering post with a handle attached thereto, to be grasped by the child using or playing with said vehicle.

In referring to my invention, I shall refer, for the purpose of explaining the same, to a baby walker. These baby walkers are usually used to assist in teaching small children the art of walking.

My present invention is an improvement on the baby walker shown in an application which I have now filed in the United States Patent Office as Serial No. 749,851, the present invention belonging to the same class of vehicles.

The salient feature of my invention consists in the forward construction of this class of vehicles. It has been common to place the steering post right above the axle or turning point for the wheels, very little of the car extending forward of the steering post. Under these conditions a child, in going down an incline, or over an obstruction, or the like is apt to tilt forward as it is gripping the handle, and this would give it an initial tendency to fall or upset forwardly. Or if the child is strong and has grown to a certain age its forward leaning strength is apt to overthrow the vehicle. For these and other reasons I have evolved a new vehicle of this class in which the wheels and supporting frames are placed materially beyond the steering post which carries the handle, thus preventing any overthrow forwardly or otherwise of the vehicle, even when striking an obstruction or going down an incline or over a rough surface, thus eliminating all the danger incident in these particulars to the old style of child vehicle.

I provide a simple, highly efficient and safe vehicle in this class, and one which need cause the parents no anxiety or worry, they knowing full well that the child is safe under all conditions.

The various features and advantages of my invention will readily become apparent from the following specification and claims.

Figure 1:
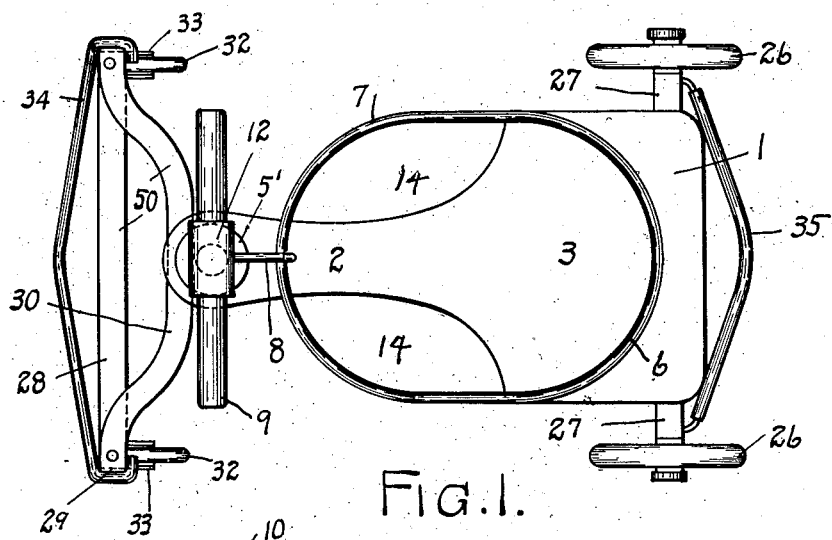
Figure 2:
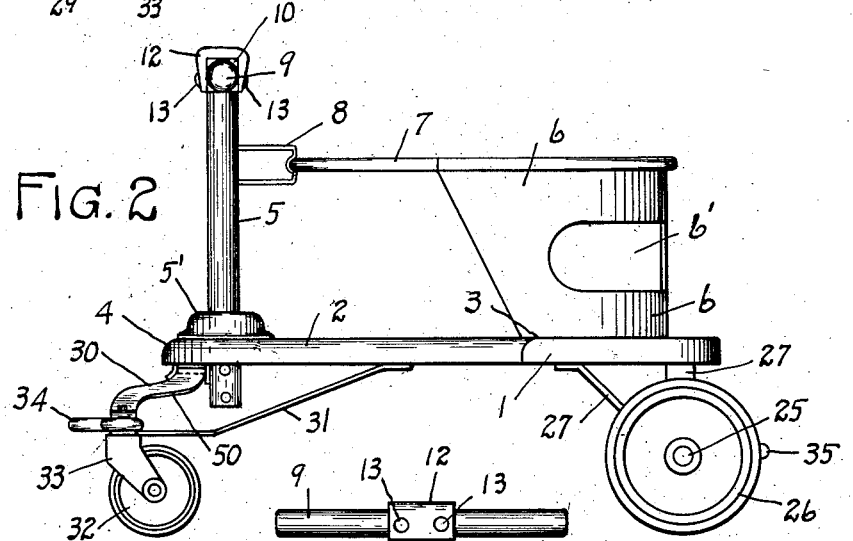
Figure 3:
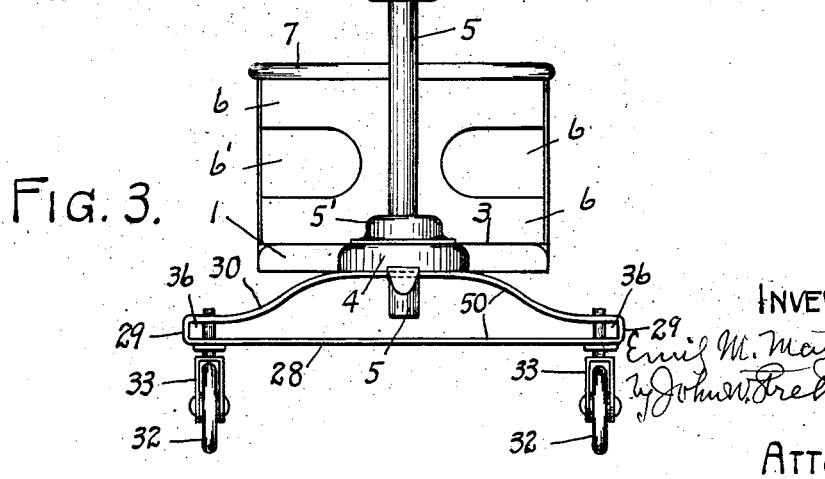

In the accompanying drawing forming a part of this specification:

Fig. 1, is a plan view of my invention,
Fig. 2, is a side elevation thereof, and
Fig. 3, is a front view.

I have illustrated in the drawing a baby walker of a kind, in connection with which my invention is used, to show the relative position of the parts, in connection with my invention.

In the drawing, 1 represents the body which is narrow at its forward part to form the neck 2, and at the rear forms the seat 3, and it is rounded off at its extreme front 4. The post 5 extends upwardly and downwardly from this forward round part of the body part 1, and is connected to said forward end of said body part in any suitable manner, and passes through a collar 5'. A seat part 6 is connected to the seat 3 of the body part, and a rail or loop 7 is present at the top of this seat part 6 and extends forward toward the post 5; said seat part generally made of metal and having ventilating holes 6' therein; this loop or rail being formed partly by the beaded top edge of the said part 6.

At the forward part, this loop or rail 7, is supported in a bracket 8, which is connected to said post 5 and acts as a support and bumper.

At the top of the post 5 I connect in any suitable manner a handle 9 which extends laterally to the right and left from said post 5. This handle is widened at the middle 10 and made of a square or rectangular effect. On this part 10 of the handle, I place the rubber cap or hood 12 held in position on the part 10 by the tacks or screws 13. In the present instance this rubber cap or hood covers the top and edge side of the part 10 of the handle as shown.

This surface 12 is made of rubber or analogous material and is provided for the child when teething, to bite upon.

The rear axle is marked 25 and the rear wheels 26, the body being supported on the rear axle by the framework 27.

The forward end of the body is supported on the bolster 50 formed of a cross bar 28 bent back upon itself at its outer edges 29, spaced as shown at 36, and then extending upwardly and backwardly to form an arched part 30, and said body is further supported by a brace rod 31. This bolster also acts as an axle and the front wheels 32 are supported and swiveled in hangers 33. A front bumper 34 and a rear bumper 35 are also attached to the forward and rear end of the vehicle.

It will be seen that the front bolster 50 supports the body of the vehicle, at its front part, in a vertical line forward of the part 5, and that the wheels 32 in a vertical line forward of the said post 5 and that the entire wheel periphery is forward of said post 5, and that this entire front bolster construction and wheels extends materially forward of the post and its handle, thus a construction is formed, which will prevent the walker from forward tilt or overthrow, presenting a vehicle of this class which is simple, highly efficient, durable, and safe, possessing market utility.

In operating, the child rests upon the seat, and is held in position by the seat part 6 and the loop or rail 7, the child's legs pass through the openings or spaces 14, and the child grips the handle 9, on each side, and by pushing or moving the feet upon the floor, the vehicle is propelled, thus the child is taught the art of walking.

I do not limit myself to the precise construction herein shown and described, but may change and vary the same, so long as such changes fall within the scope of this specification and claims; the form herein described being a preferred one.

It will be understood that I can use this forward construction of a child's walker, of a construction and type herein shown and set forth.

What I claim as new and my invention and desire to secure by Letters Patent is:

1. A foot propelled vehicle comprising a seat platform of substantially the same length as the vehicle, a rear axle and rear wheels partially supporting the platform, a substantially vertical steering post arranged in close proximity to the front edge of said platform and secured to the latter, a handle fixed to the post above the platform, a front bolster arranged below the platform and extending forwardly of the front edge of the latter, said bolster comprising a substantially straight cross bar and forwardly and laterally diverging metal arms, each arm extending downwardly from the front edge portion of the platform, and caster wheels connected to the ends of the cross bar and having their axes arranged forwardly of the front edge of the platform.

2. A foot propelled vehicle comprising a seat platform, a rear axle and rear wheels partially supporting the platform, a substantially vertical steering post arranged in close proximity to the front edge of said platform and secured to the latter, a handle fixed to the post above the platform, a front bolster arranged below the platform and extending forwardly of the front edge of the latter, said bolster comprising a substantially straight cross bar having its end portions bent upwardly and toward each other, to provide substantially U-shaped extremities for the cross bar, the end portions of the bar extending rearwardly and upwardly from said U-shaped extremities, and connected to said platform, said U-shaped extremities having apertures therein, and caster wheels having vertical pivots rotatably mounted in said apertures.

3. A vehicle of the character described, comprising a suitably supported wheeled framework, a seat and forward extension on said framework, a steering post and handle, a bolster at the forward end of said vehicle, said bolster consisting of a flat bar turned back upon itself at each end and spaced, the turned-back portions continuing to extend backwardly and upwardly to form an arch, wheels pivoted and supported by said bolster, said bolster means and wheels extending forward materially, approximately beyond the vertical line of post for the purposes set forth.

In testimony whereof, I affix my signature at Cincinnati, Ohio, this 4th day of April, 1925.

EMIL M. MAYER.